UNITED STATES PATENT OFFICE.

BRONISLAUS HONOWSKY, OF ST. PETERSBURG, RUSSIA.

METHOD OF MANUFACTURING ARTIFICIAL CORK.

No. 925,104.     Specification of Letters Patent.     Patented June 15, 1909.

Application filed February 25, 1908. Serial No. 417,755.

*To all whom it may concern:*

Be it known that I, BRONISLAUS HONOWSKY, a subject of the Russian Emperor, and resident of St. Petersburg, Russia, have invented certain new and useful Improvements in Methods of Manufacturing Artificial Cork, of which the following is a specification.

This invention relates to a method of manufacturing artificial cork from cork chips or waste, according to which the latter are bound with the aid of heavy metallic salts of the xanthate, the metallic salts forming themselves by chemical conversion during the drying process of the artificial cork composition at a temperature which lies below the decomposition temperature of the viscose itself. During the drying process of the artificial cork composition, *i. e.* of the mixture of cork chips or waste, viscose, heavy metallic oxids, and indifferent substances, glycerin and mineral oil, the single ingredients re-act on each other and form in the first instance xanthate under the influence of the natural cork acids and if the latter do exist in small quantities only under the influence of other substances of acetous nature such as boric hydrate, and in the second instance the heavy metallic salts of the xanthate, which act then as binding medium. These heavy metallic salts are perfectly insoluble in water, alcohol, ether, and the like. The volatile sulfur compounds which form themselves by the re-action of cork acid on viscose, are instantly bound with metallic oxids, while tannins produced are also transferred into the indissoluble metallic salts. The artificial cork is hereby deprived of any strange smell and taste, while also its whiteness is greatly increased the latter being even greater than with the natural or any other artificial cork.

The following is an example how to put the method into practice:—By weight, 100 parts of 4% viscose, 6 parts of zinc oxid, 15 parts of glycerin, and 100 parts of cork chips or waste are thoroughly mixed, this mixture being pressed in molds and left to itself during one or two days at room temperature, after which the moldings are taken out and dried at a gradually increased temperature.

Of course, the quantities of the ingredients employed may vary to suit requirements according to the quality of cork chips or waste, and to the object the artificial cork is destined for.

To induce the re-action it may sometimes be necessary to add the acids or other substances of acid nature, for instance if the quantity of viscose is increased or other ingredients such as sawdust are added to the cork chips or waste. In the latter case, also more glycerin and mineral oil is required to replace the deficiency of cork-wax. According to circumstances, mixtures of different heavy metallic oxids may be employed, or even mixtures of heavy metallic oxids containing volatile sulfur compounds with such metallic oxids which do not contain the latter and which serve only for lutation and formation of salt, such as aluminium.

Having fully described my invention, what I claim and desire to secure by Letters Patent is:

1. Method of manufacturing artificial cork from cork chips or waste, according to which the cork chips or waste are mixed with sodium xanthate, heavy metallic oxids, and indifferent substances, glycerin and mineral oil, and this mixture is pressed in molds and dried, for the purpose set forth.

2. Method of manufacturing artificial cork from cork chips or waste, according to which the cork chips or waste are mixed with sodium xanthate, heavy metallic oxids with an addition of acids, and indifferent substances, glycerin and mineral oil, and this mixture is pressed in molds and dried, for the purpose set forth.

3. Method of manufacturing artificial cork from cork chips or waste, according to which by weight 100 parts of 4% viscose, 6 parts of zinc oxid, 15 parts of glycerin, and 100 parts of cork chips or waste are thoroughly mixed, and this mixture is pressed in molds and left to itself during one or two days at room temperature, after which the moldings are taken out and dried at a gradually increased temperature.

In testimony whereof I have hereunto set my hand in the presence of two subscribing witnesses.

BRONISLAUS HONOWSKY.

Witnesses:
   W. STADIKOW,
   S. MOUROMOFF.